(12) United States Patent
Yu (10) Patent No.: US 11,894,524 B2
(45) Date of Patent: Feb. 6, 2024

(54) POSITIVE ELECTRODE PLATE, AND ELECTROCHEMICAL APPARATUS AND DEVICE ASSOCIATED THEREWITH

(71) Applicant: CONTEMPORARY AMPEREX TECHNOLOGY CO., LIMITED, Ningde (CN)

(72) Inventor: Yang Yu, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 176 days.

(21) Appl. No.: 17/589,705

(22) Filed: Jan. 31, 2022

(65) Prior Publication Data

US 2022/0158257 A1 May 19, 2022

Related U.S. Application Data (63) Continuation of application No. PCT/CN2020/106467, filed on Jul. 31, 2020.

(30) Foreign Application Priority Data

Aug. 8, 2019 (CN) .......................... 201910731214.9

(51) Int. Cl.
*H01M 10/42* (2006.01)
*H01M 4/13* (2010.01)
(Continued)

(52) U.S. Cl.
CPC ......... *H01M 10/4235* (2013.01); *H01M 4/13* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2011/0236761 A1 9/2011 Endo et al.
2013/0196230 A1 8/2013 Yokouchi et al.
(Continued)

FOREIGN PATENT DOCUMENTS

CN 103097472 A 5/2013
CN 103503209 A 1/2014
(Continued)

OTHER PUBLICATIONS

Abstract of JP-2010108716-A (Year: 2010).*
(Continued)

*Primary Examiner* — Gregg Cantelmo
(74) *Attorney, Agent, or Firm* — Kilpatrick Townsend & Stockton LLP (57) ABSTRACT

This application provides a positive electrode plate and an electrochemical apparatus and device associated therewith. The positive electrode plate includes a positive electrode current collector, a positive electrode active material layer disposed on at least one surface of the positive electrode current collector, and a safety layer disposed between the positive electrode active material layer and the positive electrode current collector. The safety layer includes a binding substance, a conductive substance, and a special sensitive substance, where the special sensitive substance is at least one product of esterification of polysaccharide in which a degree of esterification of monosaccharide units is 35% to 98%. The electrochemical apparatus prepared by using the positive electrode plate of this application has significantly improved safety and electrical performance (such as cycling performance).

12 Claims, 3 Drawing Sheets

(51) Int. Cl.
H01M 10/0525 (2010.01)
H01M 4/02 (2006.01)

(56) References Cited

U.S. PATENT DOCUMENTS

| | | | |
|---|---|---|---|
| 2014/0065491 A1 | 3/2014 | Yokouchi et al. | |
| 2014/0120423 A1 | 5/2014 | Matsuo et al. | |
| 2014/0342200 A1 | 11/2014 | Morita et al. | |
| 2015/0255788 A1 | 9/2015 | Yokouchi et al. | |
| 2018/0294472 A1 | 10/2018 | Fan | |
| 2019/0140281 A1 | 5/2019 | Li et al. | |
| 2019/0140328 A1 | 5/2019 | Li et al. | |
| 2020/0083527 A1 | 3/2020 | Nakamura | |
| 2020/0381774 A1 | 12/2020 | Ueno et al. | |
| 2021/0143436 A1 | 5/2021 | Yu | |

FOREIGN PATENT DOCUMENTS

| | | | |
|---|---|---|---|
| CN | 103636032 A | | 3/2014 |
| CN | 104409681 A | | 3/2015 |
| CN | 104662713 A | | 5/2015 |
| CN | 105810885 A | | 7/2016 |
| CN | 106099043 A | | 11/2016 |
| CN | 107768589 A | | 3/2018 |
| CN | 108091825 A | | 5/2018 |
| CN | 108258249 A | | 7/2018 |
| CN | 108987666 A | | 12/2018 |
| CN | 208298924 U | | 12/2018 |
| CN | 109755466 A | | 5/2019 |
| CN | 109786708 A | | 5/2019 |
| CN | 110265665 A | | 9/2019 |
| CN | 110400933 A | | 11/2019 |
| CN | 110429240 A | | 11/2019 |
| CN | 110444764 A | | 11/2019 |
| CN | 110474114 A | | 11/2019 |
| EP | 3483900 A1 | | 5/2019 |
| EP | 3809502 A1 | | 4/2021 |
| JP | H08329978 A | | 12/1996 |
| JP | 2000100437 A | | 4/2000 |
| JP | 2010108716 A | * | 5/2010 |
| JP | 2010135338 A | | 6/2010 |
| JP | 2015216007 A | | 12/2015 |
| JP | 2016076439 A | | 5/2016 |
| JP | 2019114393 A | | 7/2019 |
| WO | WO2018180742 A1 | | 10/2018 |

OTHER PUBLICATIONS

Ningder Age New Energy Technology Co. Ltd., Notification to Grant Patent Right for Invention, CN201910731214.9, dated Oct. 26, 2020, 4 pgs.
Ningder Age New Energy Technology Co. Ltd., First Office Action, CN201910731214.9, dated Jan. 6, 2020, 11 pgs.
Contemporary Amperex Technology Co., Limited, Extended European Search Report, EP20849080.5, dated Jun. 29, 2022, 10 pgs.
Contemporary Amperex Technology Co., Limited, International Search Report and Written Opinion, PCT/CN2020106467, dated Oct. 27, 2020, 17 pgs.
Contemporary Amperex Technology Co., Limited, Communication Pursuant to Article 94(3), EP20849080.5, dated Oct. 21, 2022, 7 pgs.
Xiangkun Wu et al., Safety Issues in Lithium Ion Batteries: Materials and Cell Design, Frontiers in Energy Research, vol. 7, Article 65, Jul. 17, 2019 (Jul. 17, 2019), XP055968523, 17 pgs.
First office action received in the corresponding Chinese application 201910731186.0, dated Jun. 3, 2020.
Extended European search report received in the corresponding European application 20850953.9, dated Jul. 28, 2022.
International search report received in the corresponding international application PCT/CN2020/106468, dated Oct. 29, 2020.
Written Opinion received in the corresponding international application PCT/CN2020/106468, dated Oct. 29, 2020.
Non-Final office action received in the corresponding U.S. Appl. No. 17/589,711, dated Jul. 18, 2023.
Extended European search report received in the corresponding European application 20850741.8, dated Aug. 1, 2022.
Notice of Allowance received in the corresponding U.S. Appl. No. 17/589,714, dated Sep. 22, 2023.
International search report received in the corresponding international application PCT/CN2020/106474, dated Oct. 28, 2020.
Written Opinion received in the corresponding international application PCT/CN2020/106474, dated Oct. 28, 2020.

* cited by examiner

POSITIVE ELECTRODE PLATE, AND ELECTROCHEMICAL APPARATUS AND DEVICE ASSOCIATED THEREWITH

CROSS-REFERENCE TO RELATED APPLICATIONS

This application is a continuation application of PCT Patent Application No. PCT/CN2020/106467, entitled "POSITIVE ELECTRODE PLATE AND ELECTROCHEMICAL DEVICE AND EQUIPMENT ASSOCIATED THEREWITH" filed on Jul. 31, 2020, which claims priority to Chinese Patent Application No. 201910731214.9, filed with the State Intellectual Property Office of the People's Republic of China on Aug. 8, 2019, and entitled "POSITIVE ELECTRODE PLATE AND ELECTROCHEMICAL APPARATUS CONTAINING SUCH POSITIVE ELECTRODE PLATE", all of which are incorporated herein by reference in their entirety.

This application is related to U.S. application Ser. No. 17/589,711, entitled "POSITIVE ELECTRODE PLATE, AND ELECTROCHEMICAL APPARATUS AND DEVICE ASSOCIATED THEREWITH" filed on Jan. 31, 2022, which is incorporated by reference in its entirety.

This application is related to U.S. application Ser. No. 17/589,714, entitled "ELECTROCHEMICAL ENERGY STORAGE APPARATUS AND DEVICE" filed on Jan. 31, 2022, which is incorporated by reference in its entirety.

TECHNICAL FIELD

This application relates to the electrochemical filed, and in particular to a positive electrode plate and an electrochemical apparatus and device associated therewith.

BACKGROUND

Lithium-ion batteries are widely applied to electric vehicles and consumer electronic products due to their advantages such as high energy density, high output power, long cycle life, and low environmental pollution. However, lithium-ion batteries sometimes have safety issues such as fire and explosion during overcharge, which poses a great threat to the safety of people's lives and property. In addition, the recycling rate of lithium-ion batteries has also been questioned.

Overcharge of a lithium-ion battery generally deteriorates its electrical performance, resulting in lithium precipitation on its negative electrode, which significantly deteriorates electrical performance such as cycling and capacity, and even causes short circuit in the battery. Results of a large number of experiments show that short circuit in the battery is the root cause of safety hazards of lithium-ion batteries. Researchers have tried to make improvements in many aspects in an attempt to avoid in-battery short circuit, including research on exploiting properties of PTC (Positive Temperature Coefficient) materials to improve safety performance of lithium-ion batteries. PTC materials, also referred to as positive temperature coefficient thermal materials, are characterized in having electric resistivity that increases with temperature. When the temperature exceeds a particular threshold, electric resistivity of a PTC material steps up rapidly.

A known typical practice to improve safety of a lithium-ion battery is adding a PTC material to an active material layer of the battery. As the battery temperature rises, resistance of the PTC material grows, increasing resistance of the entire active material layer, and even damaging the charge conducting path of the entire active material layer, thus cutting off the power and prohibiting further electrochemical reaction. However, experiments have shown that the PTC material added to the active material layer has an adverse effect on electrochemical performance of the battery.

It has also been reported that a separate PTC material layer could be disposed between a current collector and an active material layer of a lithium-ion battery. As the battery temperature rises, resistance of the PTC material layer grows, increasing resistance between the current collector and the active material layer, and even cutting off the power, thus prohibiting further electrochemical reaction. However, according to such method of improvement, when an active material slurry is applied onto a surface of the PTC material layer, a solvent in the slurry (such as NMP) will dissolve the PTC material in the PTC layer and enter an upper active material layer, which not only makes the PTC layer lose PTC effect but also deteriorates electrical performance of the lithium-ion battery. In addition, in a compaction step for preparing an electrode plate, the PTC material layer is extremely easy to be taken to the edge because of squeezing, resulting in direct contact between the active material layer and the current collector, thereby failing to improve the safety performance. In addition, performances such as response speed and current blocking effect of the PTC material layer all need to be greatly improved.

SUMMARY

Some embodiments of this application provide a positive electrode plate with improved safety and electrical performance (such as cycling performance) and an electrochemical apparatus and device associated therewith.

According to one aspect, this application provides a positive electrode plate, including a positive electrode current collector, a positive electrode active material layer disposed on at least one surface of the positive electrode current collector, and a safety layer disposed between the positive electrode active material layer and the positive electrode current collector. The safety layer includes a binding substance, a conductive substance, and a special sensitive substance. Each molecule of the special sensitive substance includes monosaccharide structural units, and carbonate groups and/or phosphate groups; and at least part of the carbonate groups and/or phosphate groups are bonded to two or more of the monosaccharide structural units.

According to another aspect, this application provides an electrochemical apparatus, including the positive electrode plate according to the first aspect of this application.

According to this application, when overcharge occurs, excessive voltage and certain temperature will cause the special sensitive substance in the safety layer of the positive electrode plate to be degraded, thus damaging a charge conducting network in the safety layer, blocking electronic conduction between the positive electrode current collector and the positive electrode activity material layer, thereby cutting off a charging current in time, effectively preventing the electrochemical apparatus from thermal runaway, and avoiding safety problems such as fire and explosion, which greatly improves overcharge safety performance of the electrochemical apparatus.

Compared with a positive electrode plate and an electrochemical apparatus that use a traditional PTC material as a safety layer or use an active material layer containing a PTC material, the positive electrode plate and the electrochemical apparatus including such positive electrode plate in this application undergo chemical changes first instead of physical changes at excessive high voltage and certain temperature, providing faster response, controllable response voltage, better overcharge safety and reliability, and improved electrical performance (such as cycling performance) of the electrochemical apparatus. The traditional PTC material whose volume swelling relies on changes in crystallinity only undergoes physical changes at high temperature. Such change is greatly affected by preparation processes of a material coating and the electrochemical apparatus. For example, temperature and coating speed in the preparation process of the material coating and an electrolyte in the electrochemical apparatus all have an uncontrollable effect on crystallinity of the material. When the electrochemical apparatus is overcharged, the material may probably not be excited, and therefore the charging current cannot be cut off in time, posing a safety hazard.

According to another aspect, this application provides a battery module including the foregoing electrochemical apparatus.

According to still another aspect, this application provides a battery pack including the foregoing battery module.

According to a still further aspect, this application provides a device including the foregoing electrochemical apparatus. The electrochemical apparatus can be used as a power source of the device or as an energy storage unit of the device.

The battery module, battery pack, and device in this application include the electrochemical apparatus provided by this application, and therefore have at least the same advantages as the electrochemical device in this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from these accompanying drawings without creative efforts.

Reference signs are as follows:
1. battery pack;
2. upper box body;
3. lower box body;
4. battery module; and
5. secondary battery.

DESCRIPTION OF EMBODIMENTS

The following will describe this application in detail with reference to specific examples. It should be understood that the embodiments described in this specification are merely intended to interpret this application, but not intended to limit this application. The formulations and proportions in the embodiments can be selected as appropriate, but are still within the protection scope of this application.

For simplicity, only some numerical ranges are exemplarily disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded. It should be understood that the enumeration of numerical values is merely giving examples and should not be interpreted as exhaustive.

In the descriptions of this specification, it should be noted that, unless otherwise stated, "more than", "less than", "≤", and "≥" are all inclusive of the present number, "at least one" means including one or more, and "more" in "one or more" means two or more than two.

In an embodiment of this application, a positive electrode plate is provided, including a positive electrode current collector, a positive electrode active material layer disposed on at least one surface of the positive electrode current collector, and a safety layer disposed between the positive electrode current collector and the positive electrode active material layer. In a specific embodiment, the safety layer includes a special sensitive substance. In an embodiment of this application, the special sensitive substance includes at least one product of esterification of polysaccharide.

The applicant has found that disposing the product of esterification of polysaccharide in the safety layer leads to an electrochemical degradation reaction at certain voltage or temperature to produce molecular fragments with monosaccharide structural units and ester groups. These molecular fragments have good affinity with an electrolyte. To be specific, the degraded polysaccharide esterified product is dissolved or dispersed in the electrolyte, able to block the charging process.

According to this application, a weight-average molecular weight of the special sensitive substance cannot be excessively high or excessively low. Excessive high molecular weight affects the affinity of the special sensitive substance with the electrolyte and the solubility in preparing the safety layer, causing failure to respond quickly. Excessively low weight-average molecular weight would not only fail to maintain a charge conducting network in the safety layer but also lead to excessively low decomposition voltage or temperature so that the battery cannot function properly. In an embodiment of this application, the weight-average molecular weight $M_w$ of the special sensitive substance is from 1000 to 28000. For example, the weight-average molecular weight $M_w$ of the special sensitive substance may be 1000, 1200, 1500, 2000, 2500, 3000, 3500, 4000, 4500, 5000, 5500, 6000, 6500, 7000, 7500, 8000, 8200, 8500, 9000, 9500, 10000, 11000, 12000, 13000, 14000, 15000, 16000, 17000, 18000, 19000, 20000, 25000, or 28000, including any and all ranges and sub-ranges thereof, for example, 1000 to 10000, 1000 to 20000, 1000 to 25000, 1200 to 10000, 1200 to 28000, 1200 to 19000, 1200 to 10000, 3000 to 10000, 3000 to 20000, 3000 to 28000, 5000 to 10000, 5000 to 11000, 5000 to 20000, or 5000 to 28000.

In a specific embodiment of this application, the special sensitive substance includes at least one product of esterification of polysaccharide containing 2 to 80 monosaccharide units, for example, 2, 5, 10, 15, 20, 25, 30, 35, 40, 45, 50, 55, 60, 65, 70, 75, or 80, including any and all ranges and sub-ranges thereof, for example, 2 to 50, 2 to 40, 2 to 30, 5 to 10, 5 to 30, 10 to 30, 20 to 30, 30 to 40, 40 to 50, 50 to 60, 60 to 70, or 60 to 80. The quantity of monosaccharide units in the special sensitive substance is related to overcharge safety performance and electrical performance of the electrochemical apparatus using the positive electrode plate.

In addition, the applicant has also discovered that the degree of esterification of the monosaccharide units in the special sensitive substance further affects the amount of its residual hydroxyl groups. These residual hydroxyl groups can activate and promote degradation of the special sensitive substance under certain voltage or temperature. However, excessive residual hydroxyl groups may deteriorate the electrical performance of the electrochemical apparatus.

In an embodiment of this application, the degree of esterification of the monosaccharide units in the special sensitive substance is 35% to 98%, which is more conducive to affinity between the special sensitive substance and the electrolyte. For example, the degree of esterification of monosaccharide units in the special sensitive substance may be 35%, 40%, 45%, 50%, 55%, 60%, 65%, 70%, 75%, 80%, 85%, 88%, 90%, 92%, or 98%, including any and all ranges and sub-ranges thereof, for example, 35% to 92%, 35% to 90%, 35% to 88%, 50% to 98%, 50% to 92%, 50% to 90%, 50% to 88%, 60% to 98%, 60% to 92%, 60% to 90%, or 60% to 88%.

In an embodiment of this application, the product of esterification of polysaccharide is selected from at least one of the following: dextrin carbonate and its derivatives, dextrin phosphate and its derivatives, dextrin sulfate and its derivatives, chitosan carbonate and its derivatives, chitosan phosphate and its derivatives, chitosan sulfate and its derivatives, degraded cellulose carbonate and its derivatives, degraded cellulose phosphate and its derivatives, degraded cellulose sulfate and its derivatives, hyaluronic acid carbonate and its derivatives, hyaluronic acid phosphate and its derivatives, hyaluronic acid sulfate and its derivatives, chondroitin sulfate carbonate and its derivatives, chondroitin sulfate sulfate and its derivatives, chondroitin sulfate phosphate and its derivatives, sucrose carbonate and its derivatives, sucrose phosphate and its derivatives, sucrose sulfate and its derivatives, heparin carbonate and its derivatives, heparin sulfate and its derivatives, or heparin phosphate and its derivatives.

In an embodiment of this application, the product of esterification of polysaccharide is selected from at least one of the following: dextrin carbonate and its derivatives, dextrin phosphate and its derivatives, chitosan carbonate and its derivatives, chitosan phosphate and its derivatives, degraded cellulose carbonate and its derivatives, degraded cellulose sulfate and its derivatives, degraded cellulose phosphate and its derivatives, hyaluronic acid sulfate and its derivatives, or sucrose phosphate and its derivatives.

The carbonate, sulfate, and phosphate groups in polysaccharide carbonated products, polysaccharide sulfated products, or polysaccharide phosphorylated products have good compatibility with carbonate groups in common electrolytes, favorable for infiltration of the electrolyte. In addition, the carbonate, sulfate, and phosphate groups contained in small molecules resulting from breakage due to overcharge have good affinity with the electrolyte, and are miscible in the electrolyte to become a colloidal state, thereby increasing response speed of the safety layer. In a specific embodiment of this application, the product of esterification of polysaccharide is selected from at least one of the following: dextrin methyl carbonate, dextrin ethyl carbonate, dextrin methyl phosphate, dextrin ethyl phosphate, chitosan methyl carbonate, chitosan ethyl carbonate, chitosan methyl phosphate, chitosan ethyl phosphate, degraded cellulose methyl carbonate, degraded cellulose ethyl carbonate, degraded cellulose methyl sulfate, degraded cellulose ethyl sulfate, degraded cellulose methyl phosphate, degraded cellulose ethyl phosphate, hyaluronic acid methyl sulfate, hyaluronic acid ethyl sulfate, sucrose methyl phosphate, or sucrose ethyl phosphate.

In order for the safety layer to better perform its role, in an embodiment of this application, the special sensitive substance accounts for 25% to 60% of total mass of the safety layer, for example, 25%, 30%, 35%, 37%, 40%, 45%, 50%, 54%, 55%, or 60%, including any and all ranges and sub-ranges thereof, for example, 20% to 55%, 20% to 50%, 20% to 40%, 30% to 60%, 30% to 55%, 30% to 50%, or 30% to 40%.

According to this application, the safety layer further includes a binding substance, and the embodiments of this application impose no limitations on a type of the binding substance. As an example, in an embodiment of this application, the binding substance includes one or more of polyvinylidene fluoride (PVDF), vinylidene fluoride-hexafluoropropylene copolymers, polyurethane, polyacrylonitrile, polyimide, epoxy resin, silicone resin, ethylene-vinyl acetate copolymers, sodium carboxymethyl cellulose (CMC), styrene-butadiene rubber (SBR), styrene-acrylic rubber, polyacrylic acid, polyacrylic acid-acrylate copolymers, and polyethylene-acrylate copolymers. In a specific embodiment, the binding substance includes one or more of polyvinylidene fluoride, vinylidene fluoride-hexafluoropropylene copolymers, styrene-butadiene rubber, and sodium carboxymethyl cellulose. When the safety layer includes two or more binding substances, a ratio of the binding substances is not particularly limited provided that the technical solution of this application can be implemented. For example, in a case of two such binding substances, a mass ratio therebetween may be 1:1, 2:8 or 8:2, 3:7 or 7:3, or 4:6 or 6:4.

In one embodiment, the binding substance accounts for 25% to 60% of total mass of the safety layer, for example, 25%, 28%, 30%, 32%, 35%, 40%, 45%, 50%, 53%, 54%, 55%, 57%, 58%, 59%, or 60%, including any and all ranges and sub-ranges thereof, for example, 25% to 59%, 25% to 58%, 25% to 57%, 25% to 55%, 25% to 53%, 25% to 50%, 28% to 60%, 28% to 55%, 28% to 50, 30% to 60%, 30% to 55%, or 30% to 50%.

According to this application, the safety layer further includes a conductive substance, and the embodiments of this application impose no limitations on a type of the conductive substance. As an example, in an embodiment of this application, the conductive substance includes one or more of a metal conductive material, a carbon-based conductive material, and a conductive polymer material. In a specific embodiment, the metal conductive material is selected from at least one of aluminum, aluminum alloy, copper, copper alloy, nickel, nickel alloy, titanium, or silver. In a specific embodiment, the carbon-based conductive material is selected from at least one of Ketjen black, carbonaceous mesophase spherule, activated carbon, graphite, conductive carbon black (Super-P), acetylene black, carbon fiber, carbon nanotube (CNT), or graphene. In a specific embodiment, the conductive polymer material includes at least one of polysulfur nitrides, aliphatic conjugated polymers, aromatic conjugated polymers, or aromatic heterocyclic conjugated polymers. When the safety layer includes two or more conductive substances, a ratio of the conductive substances is not particularly limited provided that the technical solution of this application can be implemented. For example, in a case of two such conductive substances, a mass ratio therebetween may be 1:1, 2:8 or 8:2, 3:7 or 7:3, or 4:6 or 6:4.

In one embodiment, the conductive substance accounts for 4% to 20% of total mass of the safety layer, for example, 4%, 5%, 6%, 8%, 10%, 15%, 18%, or 20%, including any and all ranges and sub-ranges thereof, for example, 4% to 10%, 4% to 18%, 5% to 20%, 5% to 18%, 5% to 10%, 6% to 20%, 6% to 18%, or 6% to 10%.

According to this application, the positive electrode current collector is a conventional positive electrode current collector (such as aluminum foil) known in the art that can be used in a capacitor, a primary battery, or a secondary battery, and composition and preparation methods thereof are known in the art and are not limited or further described herein provided that the technical solution of this application can be implemented.

According to this application, at least one surface of the positive electrode current collector is coated with a positive electrode active material layer. In a specific embodiment, one or two surfaces of the positive electrode current collector are coated with the positive electrode active material layer. It should be noted that the safety layer is disposed between the positive electrode current collector and the positive electrode active material layer, and therefore the safety layer has the same quantity as the positive electrode active material layer. To be specific, if one surface of the positive electrode current collector is coated with the positive electrode active material layer, the positive electrode current collector has one safety layer; and if two surfaces of the positive electrode current collector are both coated with the positive electrode active material layer, the positive electrode current collector has two safety layers. According to this application, the safety layer has no special requirements for thickness, and for example, its thickness may be 1 μm, 1.5 μm, 2 μm, 2.5 μm, or 3 μm, including any and all ranges and sub-ranges thereof, for example, 1 μm to 3 μm, 2 μm to 3 μm, or ≤3 μm. The thickness is not limited or further described herein provided that the technical solution of this application can be implemented.

The positive electrode active material layer used in this application can be selected from various positive electrode active material layers known in the art that are suitable for capacitors, primary batteries, or secondary batteries, and composition and preparation methods thereof are known in the art. The positive electrode active material layer includes a positive electrode active material, which may be a conventional positive electrode active material known in the art that can be used in a capacitor, a primary battery, or a secondary battery, for example, lithium-containing composite metal oxides, and specifically, for example, $LiCoO_2$ (LCO), $LiNiO_2$(LNO), $LiMn_2O_4$(LMO), $LiFePO_4$(LFP), one or more of lithium nickel cobalt manganese oxides (NCM) (such as NCM811, MCM523, and MCM622, 811, 523, and 622 for short), or one or more of lithium nickel manganese oxides (NCA), which is not limited or further described herein provided that the technical solution of this application can be implemented.

The positive electrode plate of this application can be prepared according to conventional methods in the art. As an example, the binding substance, conductive substance, and special sensitive substance are dissolved in a solvent at a ratio. The resulting mixture is thoroughly stirred and then applied evenly onto at least one surface of the positive electrode current collector, followed by drying to obtain a safety layer applied on the positive electrode current collector. Then, the positive electrode active material is dissolved in the solvent to form a uniform positive electrode slurry, and the positive electrode slurry is evenly applied onto the surface of the positive electrode current collector that has been coated with the safety layer, and after drying and cold pressing, the positive electrode plate of this application is obtained.

The solvent used in this application is not particularly limited provided that the technical solution of this application can be implemented. For example, the solvent may be an organic solvent, for example, an ether, a hydrocarbon, an ester, a nitrile, an amide, an alcohol, a halogenated hydrocarbon, or the like. In a specific embodiment, the ether is selected from at least one of diethyl ether, tetrahydrofuran, and ethylene glycol dimethyl ether; the hydrocarbon is selected from at least one of n-pentane, n-hexane, cyclohexane, toluene, or xylene, or trimethylbenzene; the ester is selected from at least one of ethyl acetate, methyl formate, and dimethyl phthalate; the nitriles are selected from acetonitrile; the amide is selected from N-methylpyrrolidone (NMP) and/or N,N-dimethylformamide (DMF); the alcohol is selected from at least one of ethanol or propanol; and the halogenated hydrocarbon is selected from methylene chloride and/or 1,2-dichloroethane.

A high-capacity positive electrode plate generally undergoes thermal runaway at a faster rate under overcharge. Therefore, a positive electrode plate with appropriate capacity often has greater advantages in terms of fast charging reliability. Tests have shown that when a single-sided capacity per unit area of the positive electrode plate in this application is ≤7 mAh/cm$^2$, for example, ≤7 mAh/cm$^2$, 6.5 mAh/cm$^2$, 6.2 mAh/cm$^2$, 6 mAh/cm$^2$, 5.5 mAh/cm$^2$, 5 mAh/cm$^2$, 4.5 mAh/cm$^2$, 4.1 mAh/cm$^2$, 4 mAh/cm$^2$, 3.5 mAh/cm$^2$, 3.12 mAh/cm$^2$, 3 mAh/cm$^2$, 2.5 mAh/cm$^2$, 2 mAh/cm$^2$, 1.5 mAh/cm$^2$, 1.2 mAh/cm$^2$, 1.0 mAh/cm$^2$, or any value thereof, the positive electrode plate manifests the best performance.

The special sensitive substance is degraded by chemical reactions, and therefore its degradation conditions are related to both voltage and temperature, rather than single factor control of the PTC material. According to this application, the overcharge sensitive substance of the positive electrode plate is degraded at a charging voltage of α V and temperature of β° C., where $4.2 \leq \alpha \leq 5.5$, $4.2 \leq \alpha \leq 4.5$, $4.5 \leq \alpha \leq 4.8$, $4.8 \leq \alpha \leq 5.2$, $5.2 \leq \alpha \leq 5.5$, $5.5 \leq \alpha \leq 6.0$, or $6.0 \leq \alpha \leq 6.5$, and $35 \leq \beta \leq 80$, $35 \leq \beta \leq 40$, $40 \leq \beta \leq 45$, $45 \leq \beta \leq 50$, $50 \leq \beta \leq 55$, $55 \leq \beta \leq 60$, $60 \leq \beta \leq 65$, $65 \leq \beta \leq 70$, $70 \leq \beta \leq 75$, $75 \leq \beta \leq 80$, $80 \leq \beta \leq 85$, $85 \leq \beta \leq 90$, or $90 \leq \beta \leq 95$. A positive electrode plate with the above α and β ranges can ensure both normal use at normal voltage and temperature and reliability of safety performance under overcharge.

In another aspect, this application further provides an electrochemical apparatus, including the positive electrode plate described above. In a specific embodiment, the electrochemical apparatus may be a capacitor, a bare cell, or a primary or secondary battery containing a bare cell, for example, a lithium primary battery, a lithium-ion secondary battery, a sodium-ion battery, or a magnesium-ion battery, but is not limited thereto.

In addition to including the positive electrode plate in this application, the electrochemical apparatus is known in the art in terms of construction and preparation method. The electrochemical apparatus has improved safety and electrical performance (such as cycling performance) because of use of the positive electrode plate in this application. In addition, the positive electrode plate in this application can be easily processed, and therefore manufacturing costs of the electrochemical apparatus using the positive electrode plate in this application can be reduced.

When the electrochemical apparatus in this application is overcharged, the special sensitive substance in the safety layer undergoes a chemical reaction, which in turn causes conductive substance particles in the safety layer to separate and the charge conducting network to break, making internal resistance of the electrochemical apparatus increase sharply, thereby cutting off the charging current in time, effectively preventing the electrochemical apparatus from thermal runaway, and avoiding safety problems such as fire and explosion, which greatly improves the overcharge safety performance of the electrochemical apparatus.

Compared with the design of using a traditional PTC material as a safety layer, the safety layer including the special sensitive substance in this application has better reliability, allowing an electrochemical apparatus prepared by using a positive electrode plate including such safety layer, for example, a lithium-ion secondary battery, to have better safety. The traditional PTC material whose volume swelling relies on changes in crystallinity only undergoes physical changes at high temperature. Such change is greatly affected by preparation processes of a material coating and the electrochemical apparatus. For example, temperature and coating speed in the preparation process of the material coating and an electrolyte in the electrochemical apparatus all have an uncontrollable effect on crystallinity of the material. When the electrochemical apparatus is overcharged, the material may probably not be excited, and therefore the charging current cannot be cut off in time, posing a safety hazard.

Figure 3:
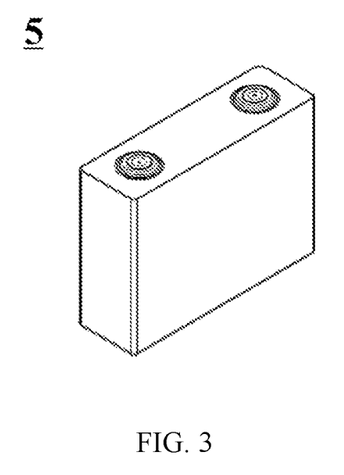
FIG. 3 is a schematic diagram of an embodiment of a secondary battery.

In a specific embodiment of this application, the electrochemical apparatus is a secondary battery. This application does not impose special limitations on a shape of the secondary battery, and the lithium-ion battery may be of a cylindrical shape, a square shape, or any other shapes. FIG. 3 is a secondary battery 5 of a square structure as an example.

In some embodiments, such secondary batteries may be combined to assemble a battery module. The battery module may include a plurality of secondary batteries whose quantity may be adjusted according to the use case and capacity of the battery module.

Figure 4:
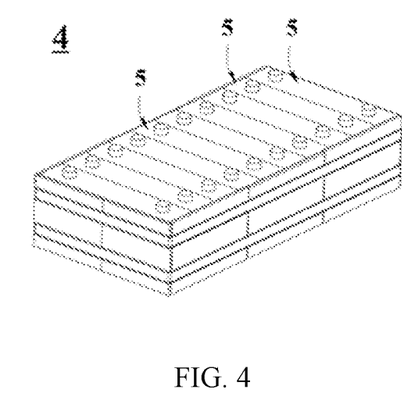
FIG. 4 is a schematic diagram of an embodiment of a battery module.

FIG. 4 shows a battery module 4 used as an example. Referring to FIG. 4, in the battery module 4, a plurality of secondary batteries 5 may be sequentially arranged along a length direction of the battery module 4. Certainly, the plurality of lithium metal batteries 5 may be arranged in any other manners. Further, the plurality of secondary batteries 5 may be fastened by using fasteners.

Optionally, the battery module 4 may further include a housing with an accommodating space, and the plurality of secondary batteries 5 are accommodated in the accommodating space.

In some embodiments, such battery modules may be further combined to assemble a battery pack, and a quantity of battery modules included in the battery pack may be adjusted based on the use case and capacity of the battery pack.

Figure 5:
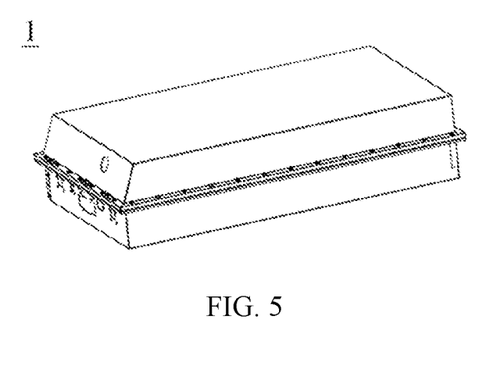
FIG. 5 is a schematic diagram of an embodiment of a battery pack.
Figure 6:
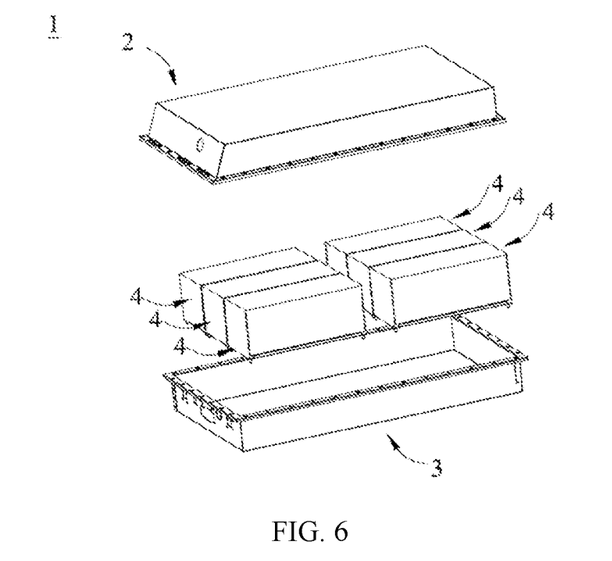
FIG. 6 is an exploded view of FIG. 5.

FIG. 5 and FIG. 6 show a battery pack 1 as an example. Referring to FIG. 5 and FIG. 6, the battery pack 1 may include a battery box and a plurality of battery modules 4 disposed in the battery box. The battery box includes an upper box body 2 and a lower box body 3, where the upper box body 2 can cover the lower box body 3 to form an enclosed space for accommodating the battery modules 4. The plurality of battery modules 4 may be arranged in the battery box in any manner.

Another aspect of this application provides a device that includes the foregoing secondary battery, and the secondary battery can be used as a power source of the device or as an energy storage unit of the device. The device may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery (cell), a battery module (module), or a battery pack (pack) may be selected for the device according to requirements for using the device.

Figure 7:
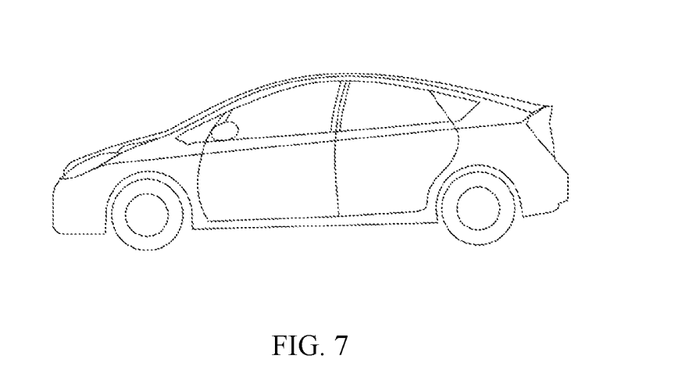
FIG. 7 is a schematic diagram of an embodiment of a device using a secondary battery as a power source.

FIG. 7 is a device as an example. The device is a battery electric vehicle, a hybrid electric vehicle, a plug-in hybrid electric vehicle, or the like. To meet requirements of the device for high power and high energy density of secondary batteries, a battery pack or a battery module may be used.

In another example, the device may be a mobile phone, a tablet computer, a notebook computer, or the like. Such device is generally required to be light and thin, and may use a secondary battery as its power source.

EXAMPLES

This application is further described with reference to specific examples. It should be understood that the following exemplary examples are only used for illustration but do not intend to limit this application. Unless otherwise stated, all percentages and ratios reported in the following examples are based on weight, all reagents used in the examples are commercially available or synthesized in a conventional manner, and can be used directly without further treatment. Experimental conditions not specified in the examples adopt conventional conditions, or adopt conditions recommended by material suppliers or equipment suppliers.

1) Preparation of a Safety Layer

A binding substance, a conductive substance, and a special sensitive substance were dissolved in a solvent at a ratio. The resulting mixture was thoroughly stirred and then evenly applied onto at least one surface of a positive electrode current collector, followed by drying to obtain a safety layer applied onto the positive electrode current collector.

2) Preparation of a Positive Electrode Plate

Positive electrode plate of this application: A positive electrode active material and a solvent were mixed at a ratio. The resulting mixture was thoroughly stirred to obtain a uniform positive electrode slurry, and then the positive electrode slurry was evenly applied onto a the positive electrode current collector that has been coated with the safety layer in step 1), followed by drying and cold pressing to obtain a positive electrode plate.

Positive electrode plate not of this application: A positive electrode active material, a conductive substance, and a binding substance were mixed at a ratio and dissolved in a solvent. The resulting mixture was thoroughly stirred and evenly applied onto at least one surface of a positive electrode current collector, followed by drying and cold pressing to obtain a positive electrode plate.

The solvents used in step 1) and step 2) could be N-methylpyrrolidone (NMP) and/or N,N-dimethylformamide (DMF), or other types of solvents previously described.

3) Preparation of an Electrolyte

Ethylene carbonate (EC), propylene carbonate (PC), and dimethyl carbonate (DMC) were mixed uniformly at a mass ratio of 1:1:1 to obtain a mixed organic solvent; then a lithium salt $LiPF_6$ was dissolved in the mixed organic solvent. The mixture was mixed uniformly to obtain an electrolyte. A concentration of $LiPF_6$ was 1 mol/L.

4) Preparation of a Lithium-Ion Secondary Battery

The positive electrode plate, a separator porous polyethylene, and the negative electrode plate were stacked in order and the resulting stack was wound to obtain a battery cell; and the battery cell was placed in an outer package, the electrolyte was injected, and then the outer package was sealed to obtain a lithium-ion secondary battery.

Examples 1 to 34

Lithium-ion secondary batteries of this application were prepared in the foregoing method according to specific components and proportions shown in Table 1.

Comparative Examples 1 to 4

Lithium-ion secondary batteries not of this application were prepared in the foregoing method according to specific components and proportions shown in Table 1.

TABLE 1

| | | Safety layer | | | | | |
|---|---|---|---|---|---|---|---|
| | | Special sensitive substance | | | | Binding substance | |
| | | Degree of esterification (%) | Mw | Number of monosaccharide units | Percentage (wt %) | Substance | Percentage (wt %) |
| | Substance | | | | | | |
| Example 1 | Dextrin methyl carbonate | 50 | −5500 | 20-30 | −37 | PVDF | 53 |
| Example 2 | Dextrin methyl carbonate | 75 | −7000 | 20-30 | 37 | Polyacrylic acid | 53 |
| Example 3 | Dextrin methyl carbonate | 88 | −8200 | 20-30 | 37 | PVDF | 53 |
| Example 4 | Dextrin methyl carbonate | 92 | −9000 | 20-30 | 37 | PVDF | 53 |
| Example 5 | Dextrin methyl carbonate | 98 | −11000 | 20-30 | 37 | PVDF | 53 |
| Example 6 | Dextrin methyl carbonate | 88 | −8500 | 20-30 | 37 | PVDF | 53 |
| Example 7 | Dextrin methyl carbonate | 90 | −10000 | 20-30 | 37 | PVDF | 53 |
| Example 8 | Degraded cellulose ethyl sulfate | 88 | −10000 | 20-30 | 37 | PVDF | 53 |
| Example 9 | Chitosan methyl carbonate | 92 | −9000 | 20-30 | 37 | PVDF | 53 |
| Example 10 | Degraded cellulose ethyl sulfate | 90 | −10000 | 20-30 | 37 | PVDF | 53 |
| Example 11 | Hyaluronic acid methyl sulfate | 88 | −9000 | 20-30 | 37 | PVDF | 53 |
| Example 12 | Sucrose ethyl phosphate | 90 | −1200 | 2 | 37 | PVDF | 53 |
| Example 13 | Degraded cellulose ethyl carbonate | 88 | −3000 | 5-10 | 37 | PVDF | 53 |
| Example 14 | Degraded cellulose ethyl carbonate | 88 | −19000 | 40-50 | 37 | PVDF | 53 |
| Example 15 | Degraded cellulose ethyl carbonate | 88 | −28000 | 60-80 | 37 | PVDF | 53 |
| Example 16 | Degraded cellulose ethyl carbonate | 88 | −10000 | 20-30 | 37 | PVDF | 53 |
| Example 17 | Degraded cellulose ethyl carbonate | 88 | −10000 | 20-30 | 37 | PVDF | 53 |
| Example 18 | Degraded cellulose ethyl carbonate | 88 | −10000 | 20-30 | 37 | PVDF | 53 |
| Example 19 | Degraded cellulose ethyl carbonate | 88 | −10000 | 20-30 | 37 | PVDF | 53 |
| Example 20 | Degraded cellulose ethyl carbonate | 88 | −10000 | 20-30 | 37 | PVDF | 53 |
| Example 21 | Degraded cellulose ethyl carbonate | 88 | −10000 | 20-30 | 25 | PVDF | 60 |
| Example 22 | Degraded cellulose ethyl carbonate | 88 | −10000 | 20-30 | 30 | PVDF | 58 |
| Example 23 | Degraded cellulose ethyl carbonate | 88 | −10000 | 20-30 | 40 | Vinylidene fluoride-hexafluoropropylene copolymer | 50 |
| Example 24 | Degraded cellulose ethyl carbonate | 88 | −10000 | 20-30 | 37 | PVDF | 59 |

TABLE 1-continued

| | | | | | | | |
|---|---|---|---|---|---|---|---|
| Example 25 | Degraded cellulose ethyl carbonate | 88 | −10000 | 20-30 | 38 | PVDF | 56 |
| Example 26 | Degraded cellulose ethyl carbonate | 88 | −10000 | 20-30 | 35 | PVDF | 45 |
| Example 27 | Degraded cellulose ethyl carbonate | 88 | −10000 | 20-30 | 54 | PVDF | 28 |
| Example 28 | Degraded cellulose ethyl carbonate | 88 | −10000 | 20-30 | 50 | PVDF | 32 |
| Example 29 | Degraded cellulose ethyl carbonate | 88 | −10000 | 20-30 | 37 | PVDF | 53 |
| Example 30 | Degraded cellulose ethyl carbonate | 88 | −10000 | 20-30 | 37 | PVDF | 53 |
| Example 31 | Degraded cellulose ethyl carbonate | 88 | −10000 | 20-30 | 37 | PVDF | 53 |
| Example 32 | Degraded cellulose ethyl carbonate | 88 | −10000 | 20-30 | 37 | PVDF | 53 |
| Example 33 | Degraded cellulose ethyl carbonate | 88 | −10000 | 20-30 | 37 | PVDF | 53 |
| Example 34 | Dextrin methyl carbonate | 35 | −5000 | 20-30 | 37 | PVDF | 53 |
| Comparative Example 1 | \ | \ | \ | \ | \ | Polyacrylic acid | 90 |
| Comparative Example 2 | \ | \ | \ | \ | \ | PVDF | 90 |
| Comparative Example 3 | \ | \ | \ | \ | \ | PVDF | 90 |
| Comparative Example 4 | \ | \ | \ | \ | \ | \ | \ |

| | Safety layer Conductive substance | | Positive electrode active material layer | | | |
|---|---|---|---|---|---|---|
| | Substance | Percentage (wt %) | Positive electrode active material layer/single-sided capacity per unit area (mAh/cm$^2$) | Single- or double-sided | Single-sided thickness of safety layer (μm) |
|---|---|---|---|---|---|
| Example 1 | SP | 10 | 811/3.12 | Single-sided | 3 |
| Example 2 | SP | 10 | 811/3.12 | Single-sided | 3 |
| Example 3 | SP | 10 | 811/3.12 | Single-sided | 3 |
| Example 4 | SP | 10 | 811/3.12 | Single-sided | 3 |
| Example 5 | SP | 10 | 811/3.12 | Single-sided | 3 |
| Example 6 | SP | 10 | 811/3.12 | Single-sided | 3 |
| Example 7 | SP | 10 | 811/3.12 | Single-sided | 3 |
| Example 8 | SP | 10 | 811/3.12 | Single-sided | 3 |
| Example 9 | SP | 10 | 811/3.12 | Single-sided | 3 |
| Example 10 | SP | 10 | 811/3.12 | Single-sided | 3 |
| Example 11 | SP | 10 | 811/3.12 | Single-sided | 3 |
| Example 12 | SP | 10 | 811/3.12 | Single-sided | 3 |
| Example 13 | SP | 10 | 811/3.12 | Single-sided | 3 |
| Example 14 | SP | 10 | 811/3.12 | Single-sided | 3 |
| Example 15 | SP | 10 | 811/3.12 | Single-sided | 3 |
| Example 16 | SP | 10 | 811/1.2 | Single-sided | 3 |
| Example 17 | SP | 10 | 811/4.1 | Single-sided | 3 |
| Example 18 | SP | 10 | 811/5.3 | Single-sided | 3 |
| Example 19 | SP | 10 | 811/6.2 | Single-sided | 3 |
| Example 20 | SP | 10 | LCO/3.2 | Single-sided | 3 |
| Example 21 | SP | 15 | 811/3.12 | Single-sided | 3 |
| Example 22 | SP | 12 | 811/3.12 | Single-sided | 3 |
| Example 23 | SP | 10 | 811/3.12 | Single-sided | 3 |
| Example 24 | SP | 4 | 811/3.12 | Single-sided | 3 |
| Example 25 | SP | 6 | 811/3.12 | Single-sided | 3 |
| Example 26 | SP | 20 | 811/3.12 | Single-sided | 3 |
| Example 27 | SP | 18 | 811/3.12 | Single-sided | 3 |
| Example 28 | SP | 18 | 811/3.12 | Single-sided | 3 |
| Example 29 | Al powder | 10 | 811/3.12 | Single-sided | 3 |
| Example 30 | CNT | 10 | 811/3.12 | Single-sided | 3 |
| Example 31 | SP + CNT | 8 + 2 | 811/3.12 | Single-sided | 3 |
| Example 32 | Acetylene black | 10 | 811/3.12 | Single-sided | 3 |
| Example 33 | SP | 10 | 811/3.12 | Double-sided | 1.5 |
| Example 34 | SP | 10 | 811/3.12 | Single-sided | 3 |
| Comparative Example 1 | SP | 10 | 811/3.12 | Double-sided | 1.5 |
| Comparative Example 2 | SP | 10 | 811/3.12 | Single-sided | 3 |
| Comparative Example 3 | CNT | 10 | LCO/3.2 | Single-sided | 3 |
| Comparative Example 4 | \ | \ | 811/3.12 | \ | \ |

Performance Test
1) Overcharge Safety Performance Test for the Lithium-Ion Secondary Battery At 25±2° C., the lithium-ion secondary battery was charged to 4.25V at a constant current rate of 1 C, then charged to a current of 0.05 C at a constant voltage of 4.25V, and then left standing for 30 minutes. Then, the battery was fixed with a damper and placed on an overcharge safety test device with ambient temperature controlled within 25±2° C. After standing for 5 minutes, the fully charged battery was overcharged at a rate of 1 C, and the real-time voltage and temperature changes of each battery were recorded until the battery caught a fire or exploded, or the charging stopped. Six samples of lithium-ion secondary batteries were tested for each of the examples and comparative examples. The test passed if no battery caught a fire or exploded, and otherwise failed.

2) Cycling Performance Test for the Lithium-Ion Secondary Battery

At 45±2° C., the lithium-ion secondary battery was charged to 4.25 V at a constant current of 1 C, charged to a current of 0.05 C at a constant voltage of 4.25V, left standing for 5 min, and then discharged to 2.8V at a constant current of 1 C, which was one charge and discharge cycle. Discharge capacity of this cycle was discharge capacity of the 1st cycle. The lithium-ion secondary battery was tested according to the foregoing method for 100 charge and discharge cycles, and the discharge capacity of each cycle was recorded.

Cycling capacity retention rate (%)=(discharge capacity of the 200th cycle/discharge capacity of the 1st cycle)× 100%

The test results of Examples 1 to 33 and Comparative Examples 1 to 5 are shown in Table 2 below.

TABLE 2

| | Pass rate of overcharge safety performance test | Capacity retention rate (%) after 200 cycles at 45° C. |
| --- | --- | --- |
| Example 1 | 6/6 | 91.2 |
| Example 2 | 6/6 | 92.8 |
| Example 3 | 6/6 | 93.7 |
| Example 4 | 5/6 | 94.5 |
| Example 5 | 3/6 | 94.1 |
| Example 6 | 6/6 | 94.2 |
| Example 7 | 3/6 | 94 |
| Example 8 | 2/6 | 93.9 |
| Example 9 | 6/6 | 94.3 |
| Example 10 | 6/6 | 94.4 |
| Example 11 | 3/6 | 94.1 |
| Example 12 | 2/6 | 93.8 |
| Example 13 | 6/6 | 94.1 |
| Example 14 | 5/6 | 94.5 |
| Example 15 | 3/6 | 94.2 |
| Example 16 | 6/6 | 95.10 |
| Example 17 | 6/6 | 91.20 |
| Example 18 | 4/6 | 89.30 |
| Example 19 | 3/6 | 83.30 |
| Example 20 | 6/6 | 93.90 |
| Example 21 | 4/6 | 94.30 |
| Example 22 | 5/6 | 94.20 |
| Example 23 | 6/6 | 93.90 |
| Example 24 | 6/6 | 91.40 |
| Example 25 | 6/6 | 94.00 |
| Example 26 | 4/6 | 94.20 |
| Example 27 | 6/6 | 92.40 |
| Example 28 | 6/6 | 93.20 |
| Example 29 | 2/6 | 94.10 |
| Example 30 | 4/6 | 93.7 |
| Example 31 | 3/6 | 94 |
| Example 32 | 5/6 | 94.2 |
| Example 33 | 6/6 | 94.0 |
| Example 34 | 2/6 | 88.0 |
| Comparative Example 1 | 0/6 | 93.20 |
| Comparative Example 2 | 0/6 | 93.80 |
| Comparative Example 3 | 0/6 | 93.60 |
| Comparative Example 4 | 0/6 | 93.20 |

It can be seen from Table 1 and Table 2 that the lithium-ion secondary batteries of this application had obviously better safety and electrical performance (such as cycling performance) than Comparative Examples 1 to 4 that used no special sensitive substances. Example 34 used a special sensitive substance with only a low degree of esterification (only 35%), and the safety performance of the lithium-ion battery was slightly improved and the electrical performance (such as cycling performance) was slightly deteriorated, but overall performance of the battery was still better than that of Comparative Examples 1 to 4. Examples 16 to 19 used positive electrode plates with different single-sided capacity per unit area, and it can be seen that as the single-sided capacity per unit area increased, the improvement of safety performance of the battery brought by the safety layer tended to drop and the electrical performance (such as cycling performance) declined, but the overall performance of the battery was still better than that of Comparative Examples 1 to 4. In summary, it can be seen from Table 1 and Table 2 that the lithium-ion secondary battery manifested significantly improved safety and electrical performance (such as cycling performance) whether the safety layer containing the special sensitive substance in this application was applied onto one or two sides of the positive electrode current collector.

Figure 1:
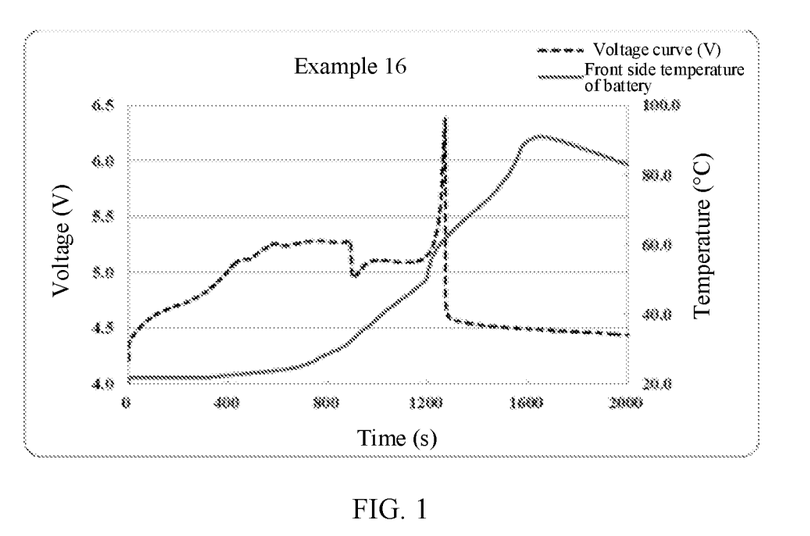
FIG. 1 is a voltage-temperature-time curve of a lithium-ion secondary battery of Example 16 of this application.
Figure 2:
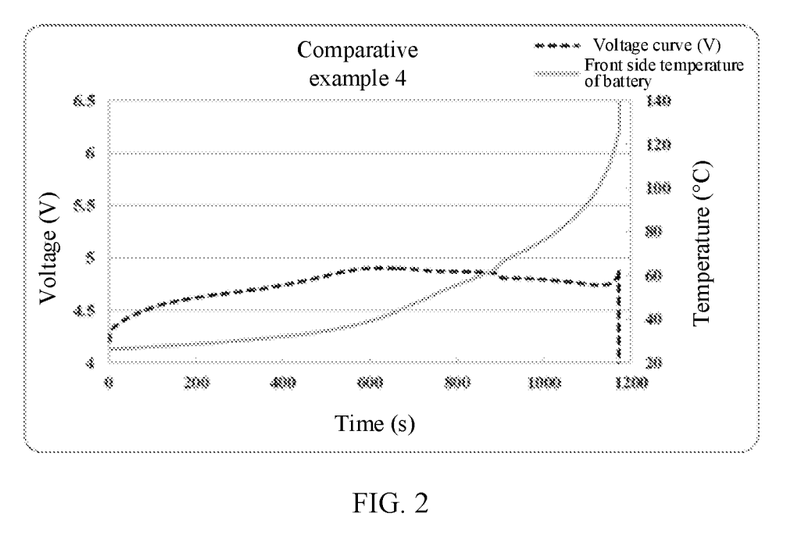
FIG. 2 is a voltage-temperature-time curve of a lithium-ion secondary battery of Comparative Example 4.

FIG. 1 is a voltage-temperature-time curve of the lithium-ion secondary battery of Example 16 according to this application. It can be seen that when the battery was overcharged, the special sensitive substance in the safety layer could respond quickly to cut off external charging current and restrain the battery temperature from rising, thereby improving the overcharge safety performance of the battery. FIG. 2 is a voltage-temperature-time curve of the lithium-ion secondary battery of Comparative Example 4. It can be seen that when the battery was overcharged, the temperature of the battery rose sharply, and the battery failed due to thermal runaway, making the battery prone to safety risks such as fire and explosion. It can be seen from comparing FIG. 1 and FIG. 2 that the lithium-ion secondary battery prepared by adding a special sensitive substance in the safety layer had significantly improved overcharge safety performance.

According to the disclosure and teaching of this specification, those skilled in the art may make further changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. A positive electrode plate, comprising:
a positive electrode current collector,
a positive electrode active material layer disposed on at least one surface of the positive electrode current collector, and
a safety layer disposed between the positive electrode current collector and the positive electrode active material layer;
wherein:
the safety layer comprises a binding substance, a conductive substance, and a special sensitive substance; and
the special sensitive substance comprises at least one product of esterification of polysaccharide, wherein a weight-average molecular weight Mw of the special sensitive substance is from 1000 to 28000, wherein a single-sided capacity per unit area of the positive electrode plate is ≤4.1 mAh/cm$^2$, and
wherein a degree of esterification of monosaccharide units in the product of esterification of polysaccharide is 50% to 98%.

2. The positive electrode plate according to claim 1, wherein the special sensitive substance comprises at least one product of esterification of polysaccharide containing 2 to 80 monosaccharide units.

3. The positive electrode plate according to claim 1, wherein the at least one product of esterification of polysaccharide comprises one or more of the following: dextrin carbonate and its derivatives, dextrin phosphate and its derivatives, dextrin sulfate and its derivatives, chitosan carbonate and its derivatives, chitosan phosphate and its derivatives, chitosan sulfate and its derivatives, degraded cellulose carbonate and its derivatives, degraded cellulose phosphate and its derivatives, degraded cellulose sulfate and its derivatives, hyaluronic acid carbonate and its derivatives, hyaluronic acid phosphate and its derivatives, hyaluronic acid sulfate and its derivatives, chondroitin sulfate carbonate and its derivatives, chondroitin sulfate and its derivatives, chondroitin sulfate phosphate and its derivatives, sucrose carbonate and its derivatives, sucrose phosphate and its derivatives, sucrose sulfate and its derivatives, heparin carbonate and its derivatives, heparin sulfate and its derivatives, and heparin phosphate and its derivatives.

4. The positive electrode plate according to claim 1, wherein the at least one product of esterification of polysaccharide comprises one or more of the following: dextrin methyl carbonate, dextrin ethyl carbonate, dextrin methyl phosphate, dextrin ethyl phosphate, chitosan methyl carbonate, chitosan ethyl carbonate, chitosan methyl phosphate, chitosan ethyl phosphate, degraded cellulose methyl carbonate, degraded cellulose ethyl carbonate, degraded cellulose methyl sulfate, degraded cellulose ethyl sulfate, degraded cellulose methyl phosphate, degraded cellulose ethyl phosphate, hyaluronic acid methyl sulfate, hyaluronic acid ethyl sulfate, sucrose methyl phosphate, and sucrose ethyl phosphate.

5. The positive electrode plate according to claim 1, wherein the special sensitive substance accounts for 25% to 60% of total mass of the safety layer.

6. The positive electrode plate according to claim 1, wherein the binding substance comprises one or more of polyvinylidene fluoride, vinylidene fluoride-hexafluoropropylene copolymers, polyurethane, polyacrylonitrile, polyimide, epoxy resin, silicone resin, ethylene-vinyl acetate copolymers, styrene-butadiene rubber, styrene-acrylic rubber, polyacrylic acid, polyacrylic acid-acrylate copolymers, and polyethylene-acrylate copolymers.

7. The positive electrode plate according to claim 1, wherein the binding substance accounts for 25% to 60% of total mass of the safety layer.

8. The positive electrode plate according to claim 1, wherein the conductive substance comprises one or more of a metal conductive material, a carbon-based conductive material, and a conductive polymer material.

9. The positive electrode plate according to claim 8, wherein the metal conductive material comprises one or more of aluminum, aluminum alloy, copper, copper alloy, nickel, nickel alloy, titanium, and silver; the carbon-based conductive material comprises one or more of Ketjen black, carbonaceous mesophase spherule, activated carbon, graphite, conductive carbon black, acetylene black, carbon fiber, carbon nanotube, and graphene; and the conductive polymer material comprises one or more of polysulfur nitrides, aliphatic conjugated polymers, aromatic conjugated polymers, and aromatic heterocyclic conjugated polymers.

10. The positive electrode plate according to claim 1, wherein the conductive substance accounts for 4% to 20% of total mass of the safety layer.

11. An electrochemical apparatus, comprising the positive electrode plate according to claim 1.

12. A device, comprising the electrochemical apparatus according to claim 11, wherein the device is one selected from the group consisting of an electric vehicle, an electric ship, an electric tool, an electronic device, and an energy storage system.

* * * * *